(No Model.)

G. NADEAU.
RUNNER ATTACHMENT FOR CHILDREN'S CARRIAGES.

No. 525,964. Patented Sept. 11, 1894.

Witnesses
John C. Wilson
A. Lewis Bowen

Inventor
Gideon Nadeau,
by Whitman & Wilkinson
Attorneys.

UNITED STATES PATENT OFFICE.

GEDEON NADEAU, OF MARINETTE, WISCONSIN.

RUNNER ATTACHMENT FOR CHILDREN'S CARRIAGES.

SPECIFICATION forming part of Letters Patent No. 525,964, dated September 11, 1894.

Application filed January 12, 1894. Serial No. 496,666. (No model.)

*To all whom it may concern:*

Be it known that I, GEDEON NADEAU, a citizen of the United States, residing at Marinette, in the county of Marinette and State of Wisconsin, have invented certain new and useful Improvements in Runner Attachments for Baby-Carriages; and I do hereby declare the following to be a full, clear, and exact description of the invention, such as will enable others skilled in the art to which it appertains to make and use the same.

My invention relates to runner attachments for baby carriages, and it consists of the herein described device by means of which the baby carriage may be readily and rapidly converted from a wheeled vehicle into a sleigh, and as conveniently re-converted from a sleigh back to a wheeled vehicle.

My invention will be understood by reference to the accompanying drawings, in which the same parts are indicated by the same letters throughout the several views.

Figure 1:
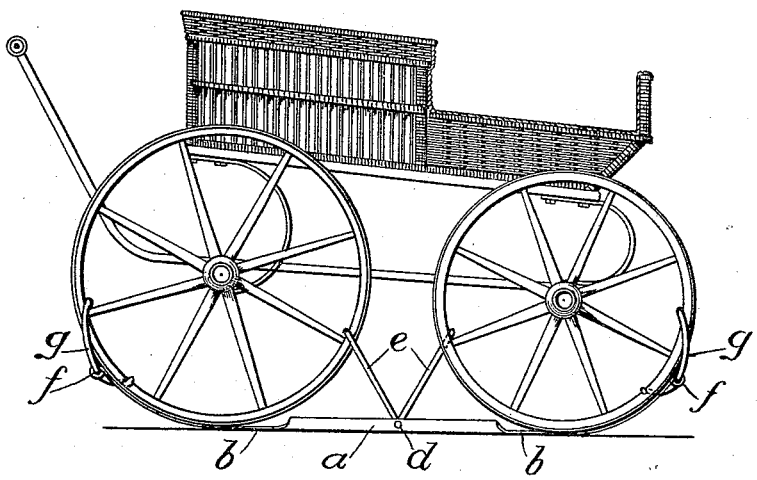
Figure 2:
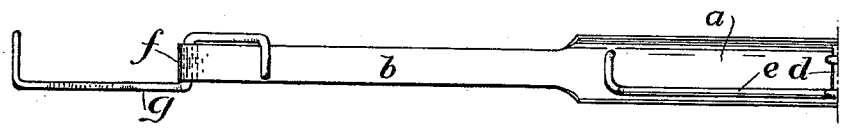
Figure 3:
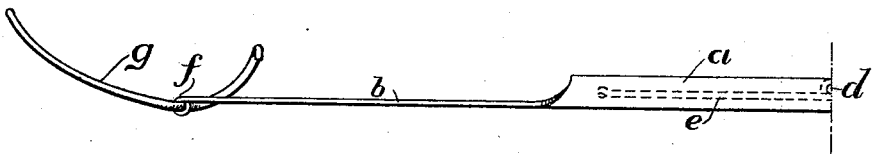

Figure 1 represents a side elevation of a baby carriage, showing my improved runner attachment connected thereto, whereby the said baby carriage is converted into a sleigh. Fig. 2 represents a plan view, enlarged, of half of the improved runner and attachments, and Fig. 3 represents a side elevation of the device shown in Fig. 2.

The runner consists of a piece of spring steel, preferably of about one and three-eighths inches in width, at the widest part, which is cut away at $b$, the ends being bent over as shown at $f$, to hold the double spring clip $g$. The broad central part of the runner is rounded as shown at $a$, and the rounded portion is spanned by a rivet $d$, on which the hooks $e$ are revolubly mounted. These hooks are preferably made of stout wire of sufficient stiffness. Thus No. 10 brass wire is well adapted for the purpose.

The device is applied to a baby carriage in the following manner: The hooks $e$ are hooked over the inner side of the fellies of the two wheels, and the two wheels are then turned until the said hooks catch over one of the spokes, and are taut. The ends $b$ are now bent up as shown in Fig. 1, and the spring clips $g$ are sprung over the rim of the wheel, firmly holding the runner in place. The runner on the other side of the carriage is put on in a similar way, and the vehicle is ready for use as a sleigh. It will thus be seen that a simple, convenient, and exceedingly cheap device is provided, whereby a baby carriage running on wheels may be readily and rapidly converted into a sleigh, or the sleigh re-converted into a baby carriage. In the latter operation, the clips $g$ are simply detached from the wheels, and the wheels turned sufficiently to allow the hooks $e$ to be disengaged, when the sleigh is once more a baby carriage running on wheels.

Having thus described my invention, what I claim, and desire to secure by Letters Patent of the United States, is—

A runner attachment for baby carriages comprising a plate of resilient material curved up in the center as at $a$ and having narrow ends $b$ bent over as at $f$, a rivet $d$ across said curved central portion, hooks $e$ secured to said rivet and adapted to engage in the wheels, and spring clips $g$ adapted to engage the rims of the wheels, substantially as and for the purposes described.

In testimony whereof I affix my signature in presence of two witnesses.

GEDEON NADEAU.

Witnesses:
W. F. OVERBECK,
P. CLIFFORD.